US011740338B2

(12) United States Patent
DeLaus et al.

(10) Patent No.: US 11,740,338 B2
(45) Date of Patent: Aug. 29, 2023

(54) RESOLVING RETURN SIGNALS AMONG PIXELS IN FREQUENCY-MODULATED CONTINUOUS-WAVE (FMCW) LIDAR SYSTEMS

(71) Applicant: Aptiv Technologies Limited, St. Michael (BB)

(72) Inventors: Michael DeLaus, Boston, MA (US); Chenghui Hao, Cambridge, MA (US); Le Zheng, Calabasas, CA (US); Roman Dietz, Berlin (DE)

(73) Assignee: Aptiv Technologies Limited, St. Michael (BB)

( * ) Notice: Subject to any disclaimer, the term of this patent is extended or adjusted under 35 U.S.C. 154(b) by 568 days.

(21) Appl. No.: 16/920,179

(22) Filed: Jul. 2, 2020

(65) Prior Publication Data

US 2022/0003854 A1    Jan. 6, 2022

(51) Int. Cl.
*G01S 7/4915* (2020.01)
*G01S 17/931* (2020.01)
(Continued)

(52) U.S. Cl.
CPC .......... *G01S 7/4915* (2013.01); *G01S 7/4814* (2013.01); *G01S 17/34* (2020.01); *G01S 17/58* (2013.01);
(Continued)

(58) Field of Classification Search
CPC ...... G01S 7/4915; G01S 7/4814; G01S 17/34; G01S 17/58; G01S 17/931; G01S 17/26; G01S 7/4815; G01S 7/4802; G05D 1/0231
(Continued)

(56) References Cited

U.S. PATENT DOCUMENTS 4,594,000 A    6/1986    Falk et al.
7,339,518 B2    3/2008    Kazuma et al.
(Continued)

FOREIGN PATENT DOCUMENTS

EP    2618179    7/2013
EP    3822658    5/2021
(Continued)

OTHER PUBLICATIONS

"Extended European Search Report", EP Application No. 21182491.7, dated Nov. 30, 2021, 9 pages.
(Continued)

*Primary Examiner* — Luke D Ratcliffe
(74) *Attorney, Agent, or Firm* — Sawtooth Patent Group PLLC

(57) ABSTRACT

This document describes techniques and systems to resolve return signals among pixels in lidar systems. The described lidar system transmits signals with different waveforms for consecutive pixels to associate return signals with their corresponding pixels. During a detection window, the lidar system receives a return signal and compares it in the frequency domain to at least two template signals. The template signals include the waveform of an initial pixel and a subsequent pixel of two consecutive pixels, respectively. The lidar system then determines, based on the comparison to the template signals, the pixel to which the return signal corresponds and determines a characteristic of an object that reflected the return signal. In this way, the lidar system can confidently resolve detections to reduce the time between pixels. This improvement allows the described lidar system to operate at faster scanning speeds and realize a faster reaction time for automotive applications.

20 Claims, 8 Drawing Sheets

(51) Int. Cl.
    *G01S 17/34*     (2020.01)
    *G01S 7/481*     (2006.01)
    *G01S 17/58*     (2006.01)
    *G05D 1/02*     (2020.01)

(52) U.S. Cl.
    CPC .......... *G01S 17/931* (2020.01); *G05D 1/0231* (2013.01)

(58) Field of Classification Search
USPC ...... 356/356, 4.01, 5.01, 28, 5.09, 5.1, 3.01,
356/614, 4.07, 141.1, 4.1, 5.15, 3.1, 5.03,
356/3, 5.04, 4.09, 486, 27, 498, 5.08,
356/484, 5.05, 5.11, 5.02, 5.06, 3.11,
356/141.4, 3.03, 4.03, 4.06, 4.08, 398, 73,
356/138, 3.09, 3.12, 5.07, 482, 5.13, 3.02,
356/3.06, 341, 4.02, 3.08, 3.13, 3.14,
356/4.05, 139.04, 3.15, 485, 493, 5.12,
356/5.14, FOR. 130, 139.07, 3.05, 3.04,
356/4.04, 141.2, 222, 3.16, 435
See application file for complete search history.

(56) References Cited

U.S. PATENT DOCUMENTS

| | | | |
|---|---|---|---|
| 2016/0123718 | A1 | 5/2016 | Roos et al. |
| 2016/0377721 | A1* | 12/2016 | Lardin .................. G01S 17/58 356/5.09 |
| 2017/0146648 | A1 | 5/2017 | Lim et al. |
| 2018/0284247 | A1 | 10/2018 | Campbell et al. |
| 2019/0018110 | A1 | 1/2019 | Kremer et al. |
| 2019/0025431 | A1 | 1/2019 | Satyan et al. |
| 2019/0086518 | A1 | 3/2019 | Hallstig et al. |
| 2019/0310372 | A1* | 10/2019 | Crouch .................. G01S 17/89 |
| 2021/0149031 | A1 | 5/2021 | Dietz et al. |
| 2021/0247490 | A1 | 8/2021 | Fu |
| 2022/0011417 | A1 | 1/2022 | Hao et al. |

FOREIGN PATENT DOCUMENTS

| | | |
|---|---|---|
| EP | 3822659 | 5/2021 |
| WO | 2018067158 | 4/2018 |
| WO | 2018160240 | 9/2018 |

OTHER PUBLICATIONS

"Extended European Search Report", EP Application No. 21183613.5, dated Dec. 2, 2021, 9 pages.
"Extended European Search Report", EP Application No. 19209595.8, dated Sep. 28, 2020, 13 pages.
Baghmisheh, "Chip-scale Lidar", Jan. 19, 2017, 46 pages.
Gao, "Frequency-modulated Continuous-wave Lidar using I/Q Modulator for Simplified Heterodyne Detection", Optic Letters / vol. 37, No. 11, Jun. 1, 2012, pp. 2022-2024.
Kakuma, "Frequency-Modulated Continuous-Wave Laser Radar Using Dual Vertical-Cavity Surface-Emitting Laser Diodes for Real-Time Measurements of Distance and Radial Velocity", Optical Review, 24, 39-46, Dec. 3, 2016, 8 pages.
Khader, et al., "An Introduction to Automotive LIDAR", Texas Instruments Incorporated, 2018, Oct. 2018, 7 pages.
Mateo, "Applications of High Resolution and Accuracy Frequency Modulated Continuous Wave Ladar", Thesis—Montana State University, Nov. 2014, 130 pages.
Xu, et al., "Simultaneous Real-Time Ranging and Velocimetry via a Dual-Sideband Chirped Lidar", IEEE Photonics Technology Letters, vol. 29, Issue: 24, Dec. 2017, 4 pages.
Zhang, et al., "Laser frequency sweep linearization by iterative learning pre-distortion for FMCW LiDAR", Mar. 2019, 10 pages.
Gao, et al., "Complex-Optical-Field Lidar System for Range and Vector Velocity Measurement", Optics Express, vol. 20, Issue 23, pp. 25867-25875; Retrieved from https://doi.org/10.1364/OE.20.025867, Nov. 1, 2012, 9 pages.
Onori, et al., "Coherent Interferometric Dual-Frequency Laser Radar for Precise Range/Doppler Measurement", Journal of Lightwave Technology, vol. 34, Issue: 20, Oct. 15, 2016; Retrieved from https://doi.org/10.1109/JLT.2016.2589538, 2016, 6 pages.
Pursuant to MPEP § 2001.6(b) the applicant brings the following co-pending application to the Examiner's attention: U.S. Appl. No. 16/924,079.
"Extended European Search Report", EP Application No. 21152779.1, dated Jul. 15, 2021, 8 pages.
"Extended European Search Report", EP Application No. 20206998.5, dated Jul. 28, 2021, 13 pages.
"Foreign Office Action", EP Application No. 21182491.7, dated Dec. 22, 2022, 9 pages.
Kim, et al., "A Hybrid 3D LIDAR Imager Based on Pixel-by-Pixel Scanning and DS-OCDMA", Proceedings of the SPIE, vol. 9751, Mar. 2016, 8 pages.

* cited by examiner

RESOLVING RETURN SIGNALS AMONG PIXELS IN FREQUENCY-MODULATED CONTINUOUS-WAVE (FMCW) LIDAR SYSTEMS

BACKGROUND

Automotive lidar systems use laser signals to determine the speed and distance of stationary and moving objects (e.g., other vehicles, pedestrians, obstacles). Frequency-modulated continuous-wave (FMCW) lidar is a promising technology for next-generation autonomous-driving sensors because it allows for strong signal-to-noise ratio (SNR), immunity to ambient light, and concurrent measurement of range and range-rate information for nearby objects.

FMCW lidar systems measure range and range-rate information by comparing a reflected return signal to its corresponding emitted laser signal. Some FMCW lidar systems include additional time between transmit signals for different pixels. While this additional time temporally separates return signals from one another and enables the FMCW lidar system to correctly associate each return signal to its corresponding pixel, the additional time between transmissions increases the scan time, and therefore reduces the frame rate, of the FMCW lidar system. Consequently, the reduced frame rate can reduce the reaction time of the FMCW lidar system and reduce the viability of the FMCW lidar system for many automotive applications.

SUMMARY

This document describes techniques and systems to resolve return signals among pixels in FMCW lidar systems. The described FMCW lidar system transmits signals with different waveforms for consecutive pixels to associate return signals with their corresponding pixels. During a detection window, the lidar system receives a return signal and compares it in the frequency domain to at least two template signals. The template signals include the waveform of an initial pixel and a subsequent pixel of two consecutive pixels, respectively. The lidar system then determines, based on the comparison to the template signals, the pixel to which the return signal corresponds and determines a characteristic of an object that reflected the return signal. In this way, the lidar system can confidently resolve detections, including multiple return signals within the same detection window, to reduce the time between the transmit signals. This improvement allows the described FMCW lidar system to operate at faster frame rates and realize a faster reaction time for automotive applications.

For example, this document describes a method to resolve return signals among pixels in FMCW lidar systems. The described method transmits signals with different amplitude modulations for consecutive pixels to associate return signals with their corresponding pixels. The amplitude modulation applied to an initial pixel is different than the amplitude modulation applied to a subsequent pixel of two consecutive pixels. During a detection window, the described method receives a return signal and compares it in the frequency domain to at least two template signals. The template signals have the amplitude modulation of the consecutive pixels, respectively. The method then determines, based on the comparison to the template signals, the pixel to which the return signal corresponds and identifies a characteristic of an object that reflected the return signal.

This document also describes lidar systems for performing the above-summarized method and other methods set forth herein.

This summary introduces simplified concepts for resolving return signals among pixels in FMCW lidar systems, which are further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of resolving return signals among pixels in FMCW lidar systems are described in this document with reference to the following figures. The same numbers are often used throughout the drawings to reference like features and components:

FIG. 3-1 illustrates an example operation of the described FMCW lidar system that resolves return signals among pixels.

FIG. 3-2 illustrates a frequency-time plot of transmit signals and return signals for multiple pixels of the FMCW lidar system.

FIG. 5-1 illustrates an example signal-matching module of the described FMCW lidar system.

FIG. 5-2 illustrates another example signal-matching module with feedback of the described FMCW lidar system.

DETAILED DESCRIPTION

Overview

Figure 1:
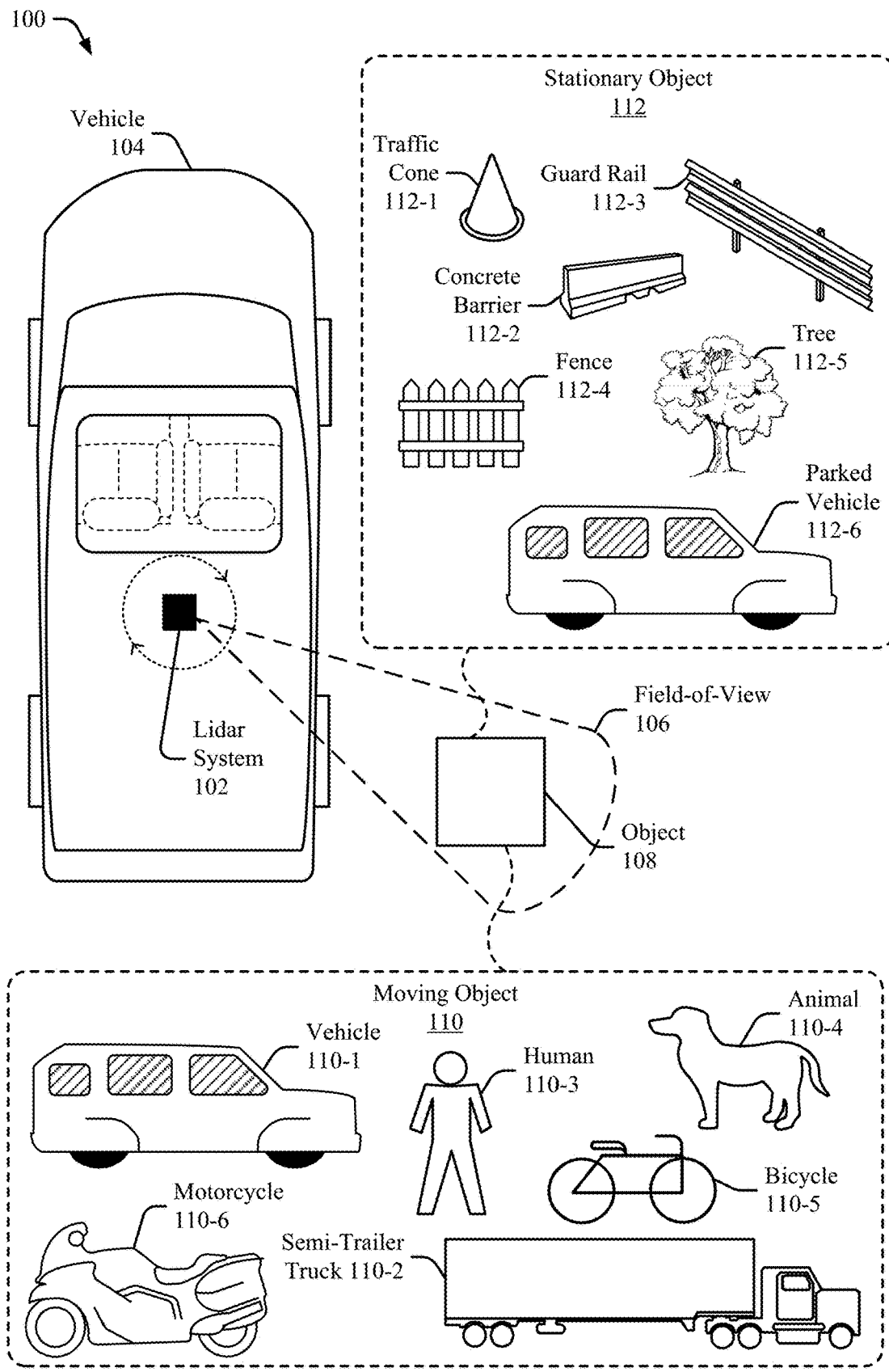
FIG. 1 illustrates an example environment in which an FMCW lidar system that resolves return signals among pixels can be implemented.

Automotive lidar systems are an important sensing technology on which some vehicle-based systems rely to acquire critical information about the surrounding environment. A lidar system has a field-of-view that represents a volume of space within which it looks for objects. The field-of-view is composed of a large number of pixels (e.g., one million pixels). The time it takes the lidar system to scan each pixel (e.g., collect information for all the pixels) within the field-of-view is a frame rate. While scanning each pixel in a sequence of frames and depending on characteristics of the transmitted signals, the lidar system can determine range and range-rate information (e.g., distance and radial velocity, respectively) and angular information of nearby objects.

An FMCW lidar system scans each pixel by emitting a frequency-modulated laser signal and detecting a return signal. Some FMCW lidar systems include a delay time in transmitting signals between each pixel to isolate return signals and avoid ambiguities in associating return signals with their corresponding pixels. This delay varies (e.g., one to ten microseconds) based on the desired detection range and confidence.

By way of example, consider an FMCW lidar system that scans an initial pixel and a subsequent pixel of consecutive pixels. A first object in the initial pixel is far from the lidar system, while a second object in the subsequent pixel is close. Some FMCW lidar systems ensure that a return signal reflected by the first object is associated with the initial pixel by waiting a certain time period for the return signal to be received before transmitting a subsequent signal for the subsequent pixel. As a result, these lidar systems include time delays among transmit signals to resolve detections among pixels. The increased transmission time slows the frame rate of these FMCW lidar systems, making them less suited for high-throughput applications. If the FMCW lidar system, however, does not implement the transmission delay, the FMCW lidar system can receive the return signal that is reflected by the first object and another return signal that is reflected by the second object during a same detection window. As such, it can be challenging for the FMCW lidar system to associate the return signals to their corresponding pixels confidently in order to determine the angular position of each object.

This document describes techniques and systems to resolve return signals among pixels in FMCW lidar systems to enable faster frame rates and increased confidence in processing return signals. The techniques and systems transmit signals with different waveforms for consecutive pixels to associate return signals with their corresponding pixels. The waveform applied to an initial pixel is different than the waveform applied to a subsequent pixel of two consecutive pixels. During a detection window, the lidar system receives a return signal and compares it in the frequency domain to at least two template signals. The template signals include the waveform of the consecutive pixels, respectively. The techniques and systems then determine, based on the comparison of the return signal to the template signals, the pixel to which the return signal corresponds and identify a characteristic of an object that reflected the return signal. The described FMCW lidar system reduces the transmission time between pixels because it can accurately resolve detections, including multiple return signals, within a detection window. The reduced transmission time allows the described FMCW lidar system to increase its frame rate compared to other FMCW lidar systems. With a FMCW lidar system that has a faster frame rate and resolves return signals among pixels, a vehicle system (e.g., a collision-avoidance system) can obtain lidar data more quickly and more confidently, which improves its analysis of the surrounding environment.

This is just one example of how the described techniques and systems resolve return signals among pixels in FMCW lidar systems. This document describes other examples and implementations. This document now describes example operating environments, devices, and methods.

Operating Environment

FIG. 1 illustrates an example environment 100 in which the described FMCW lidar system 102 can be implemented. The FMCW lidar system 102 (referred to simply as "lidar system 102") transmits laser light and resolves return signals among pixels. In the depicted environment 100, the lidar system 102 is mounted to, or integrated within, a vehicle 104. The lidar system 102 is capable of detecting one or more objects 108 that are in proximity to the vehicle 104. Although illustrated as a car, the vehicle 104 can represent other types of motorized vehicles (e.g., a motorcycle, a bus, a tractor, a semi-trailer truck, or construction equipment), types of non-motorized vehicles (e.g., a bicycle), types of railed vehicles (e.g., a train or a trolley car), watercraft (e.g., a boat or a ship), aircraft (e.g., an airplane or a helicopter), or spacecraft (e.g., satellite). In some cases, the vehicle 104 can tow or include a trailer or other attachments. In general, vehicle manufacturers can mount the lidar system 102 to any moving platform, including moving machinery or robotic equipment.

Figures 1, 3:
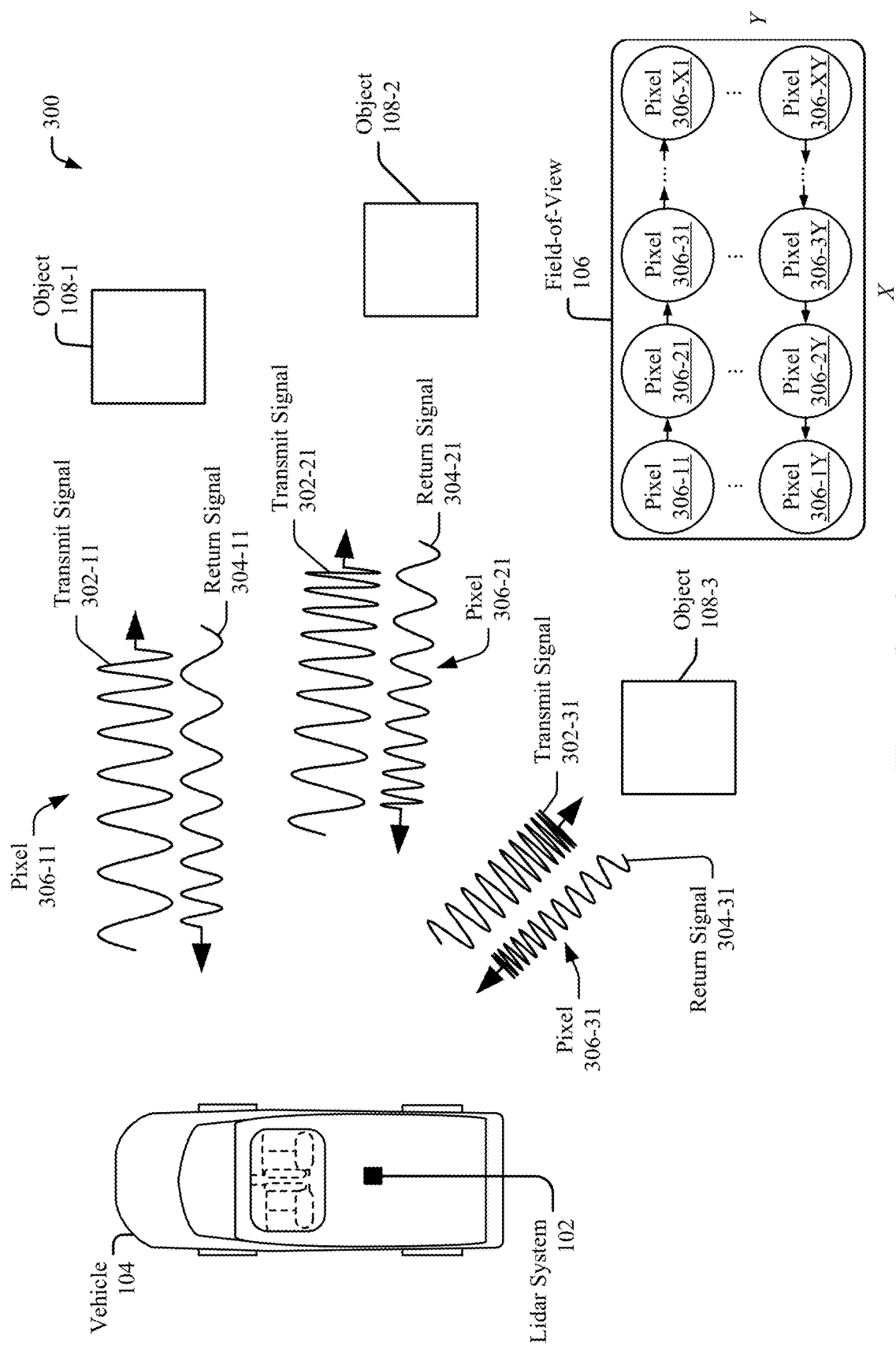
Figures 2, 3:
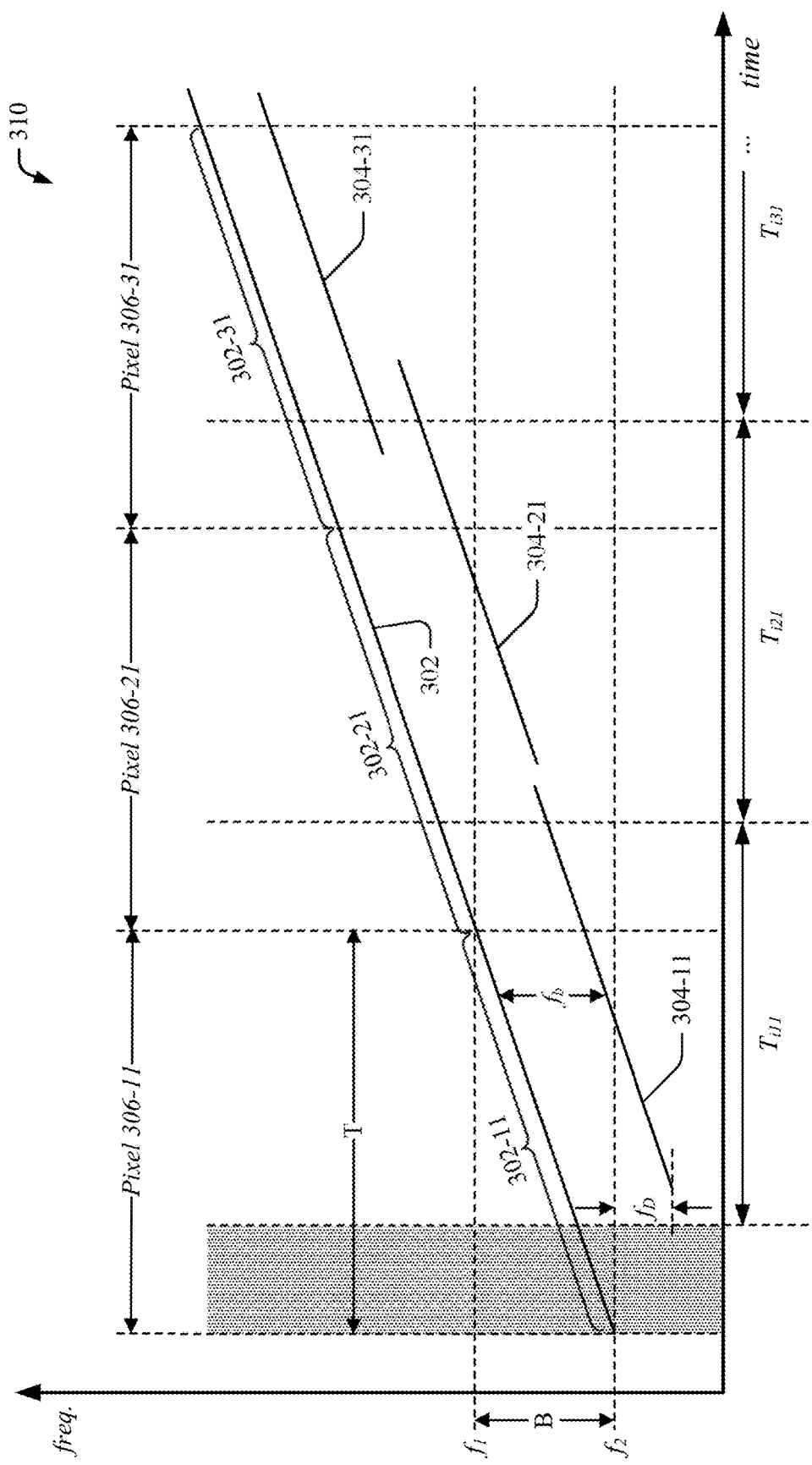

In the depicted implementation, the lidar system 102 is mounted on the roof of the vehicle 104 and provides a field-of-view 106 illuminating the object 108. The lidar system 102 divides the field-of-view 106 into pixels (as illustrated in FIG. 3-1). The lidar system 102 can project the field-of-view 106 from any exterior surface of the vehicle 104. For example, vehicle manufacturers can integrate the lidar system 102 into a bumper, side mirror, or any other interior or exterior location where distance and radial velocity of the object 108 require detection. In some cases, the vehicle 104 includes multiple lidar systems 102, such as a first lidar system 102 and a second lidar system 102 that together provide a larger field-of-view 106. In general, vehicle manufacturers can design the locations of the one or more lidar systems 102 to provide a particular field-of-view 106 that encompasses a region of interest in which the object 108 may be present. Example field-of-views 106 include a 360-degree field-of-view, one or more 180-degree fields of view, one or more 90-degree fields of view, and so forth, which can overlap or be combined into a field-of-view 106 of a particular size.

The object 108 is composed of one or more materials that reflect lidar signals. Depending on the application, the object 108 can represent a target of interest. In some cases, the object 108 is a moving object 110, such as another vehicle 110-1, a semi-trailer truck 110-2, a human 110-3, an animal 110-4, a bicycle 110-5, or a motorcycle 110-6. In other cases, the object 108 represents a stationary object 112, such as a traffic cone 112-1, a concrete barrier 112-2, a guard rail 112-3, a fence 112-4, a tree 112-5, or a parked vehicle 112-6. The stationary object 112 can be continuous (e.g., the concrete barrier 112-2, the guard rail 112-3) or discontinuous (e.g., the traffic cone 112-1) along a portion of the road.

In general, the lidar system 102 is different than some FMCW lidar systems because it uses a different waveform for consecutive pixels to resolve return signals among pixels instead of incorporating a transmission delay between transmit signals for different pixels. The different waveforms can be formed using different amplitude modulations for consecutive pixels, for example. The lidar system 102 uses the waveforms to generate template signals in the frequency domain and compares a return signal to the template signals. From the comparison of the return signal to the template signals, the lidar system 102 identifies the pixel that corresponds to the return signal and a characteristic of the object 108 that reflected the return signal. Example characteristics include range and range-rate information or angular information for the object 108. The lidar system 102 can output one or more of these characteristics for automotive applications (e.g., autonomous-driving systems, driver-assistance systems). By using different waveforms for consecutive pixels, the lidar system 102 can scan more frames in less time than other lidar systems that must extend the total time for each pixel to isolate return signals. The lidar system 102 can also process and detect return signals for multiple pixels within a single detection window to further increase its throughput.

Figure 2:
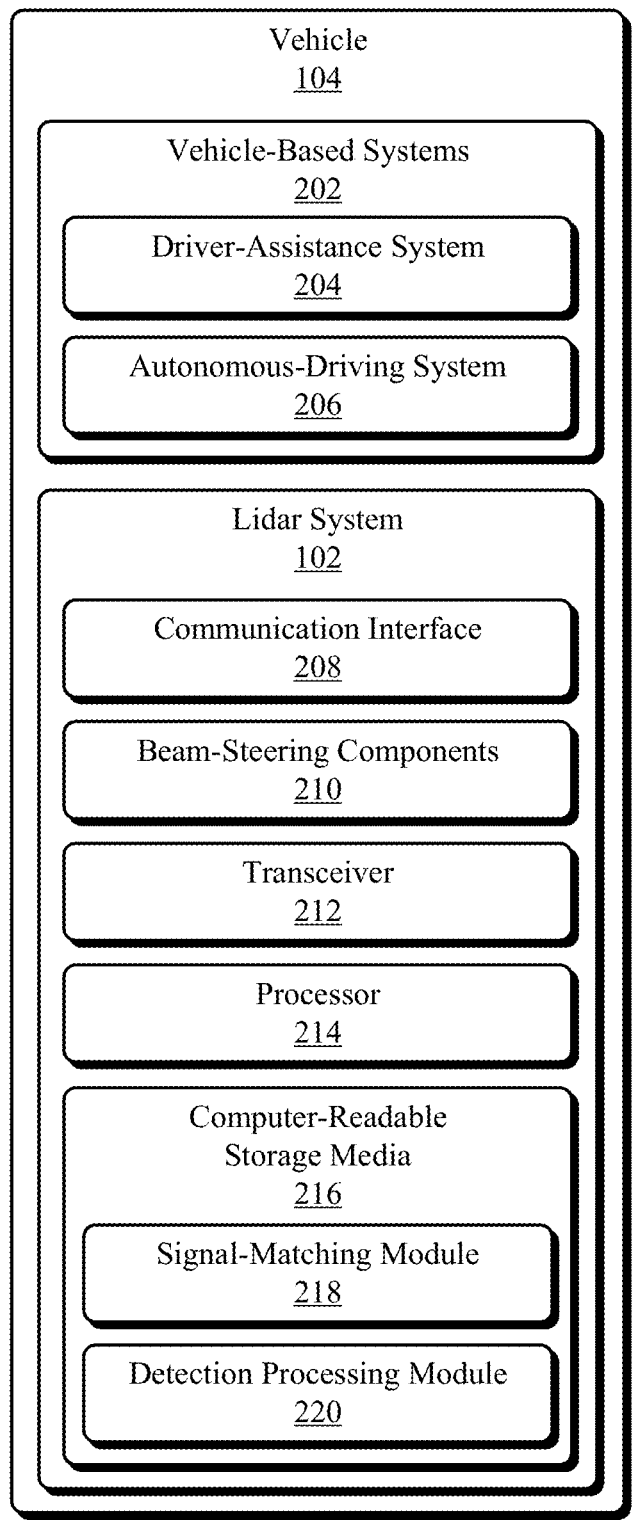
FIG. 2 illustrates an example implementation of the described FMCW lidar system as part of a vehicle.

FIG. 2 illustrates the lidar system 102 as part of the vehicle 104. The vehicle 104 also includes vehicle-based systems 202 that rely on data from the lidar system 102, such as a driver-assistance system 204 and an autonomous-driving system 206. Generally, the vehicle-based systems 202 use lidar data provided by the lidar system 102 to perform a function. For example, the driver-assistance system 204 provides blind-spot monitoring and generates an alert that indicates a potential collision with an object 108 that is detected by the lidar system 102. In this case, the lidar data from the lidar system 102 indicates when it is safe or unsafe to change lanes.

As another example, the driver-assistance system 204 suppresses alerts responsive to the lidar system 102, indicating that the object 108 represents a stationary object 112, such as a road barrier. In this way, the driver-assistance system 204 can avoid annoying the driver with alerts while the vehicle 104 is driving next to the road barrier. Suppressing alerts can also be beneficial in situations in which reflections from the road barrier generate false detections that appear to be moving objects. By suppressing the alerts, these false detections will not cause the driver-assistance system 204 to alert the driver.

The autonomous-driving system 206 may move the vehicle 104 to a particular location on the road while avoiding collisions with objects 108 detected by the lidar system 102. The lidar data provided by the lidar system 102 can provide information about distance and radial velocity of the objects 108 to enable the autonomous-driving system 206 to perform emergency braking, perform a lane change, or adjust the speed of the vehicle 104.

The lidar system 102 includes a communication interface 208 to transmit the lidar data to the vehicle-based systems 202 or another component of the vehicle 104. The communication interface 208 can transmit the data over a communication bus of the vehicle 104, for example, when the individual components of the lidar system 102 are integrated within the vehicle 104. In general, the lidar data provided by the communication interface 208 is in a format usable by the vehicle-based systems 202. In some implementations, the communication interface 208 may provide information to the lidar system 102, such as the speed of the vehicle 104 or whether a turn blinker is on or off. The lidar system 102 can use this information to configure itself appropriately. For example, the lidar system 102 can determine an absolute speed of the object 108 by compensating for the speed of the vehicle 104. Alternatively, the lidar system 102 can dynamically adjust the field-of-view 106 based on whether a right-turn blinker or a left-turn blinker is on.

The lidar system 102 also includes beam-steering components 210 and a transceiver 212. The beam-steering components 210 can include mechanical and/or electromechanical components to shape or steer lidar laser signals and for detecting lidar reflections. Using the beam-steering components 210, the lidar system 102 can steer and shape lidar signals through various optical beamforming techniques.

The lidar system 102 can include mechanical beam-steering components. In which case, the beam-steering components 210 include high-grade optics and a rotating assembly to create a wide (e.g., three-hundred-sixty degree) field-of-view 106. Alternatively, the lidar system 102 can be a solid-state lidar system, such as a microelectromechanical-system (MEMS)-based lidar system, a flash-based lidar system, or an optical phased-array lidar system. When configured as a solid-state lidar system, the beam-steering components 210 do not include a rotating mechanical component and may, therefore, be less expensive than a mechanical-scanning lidar system. The lidar system 102 can include multiple solid-state lidar modules, with each module positioned at a different location on the vehicle 104. For example, the modules may be on the front, rear, or sides of the vehicle 104 and, when combined, create a single point cloud. In such an arrangement, the lidar system 102 has a field-of-view 106 that is similar to the field-of-view 106 of a mechanical-scanning lidar system.

The transceiver 212 includes components, circuitry, and logic for emitting lidar signals via the beam-steering components 210 and receiving reflected lidar signals via the beam-steering components 210. The transceiver 212 can include a transmitter and a receiver integrated together into a single package or it can include the transmitter and receiver as separate components. The transceiver 212 and its operation is further described with respect to FIG. 4.

The lidar system 102 also includes one or more processors 214 and computer-readable storage media (CRM) 216. The CRM 216 includes a signal-matching module 218 and a detection processing module 220. The signal-matching module 218 and the detection processing module 220 can be implemented using hardware, software, firmware, or a combination thereof. In this example, the processor 214 executes instructions for implementing the signal-matching module 218 and the detection processing module 220. Together, the signal-matching module 218 and the detection processing module 220 enable the processor 214 to control the transmission of lidar signals, process responses from the beam-steering components 210, and generate lidar data for the vehicle-based systems 202.

The signal-matching module 218 processes return signals provided by the transceiver 212 into data that is usable by the detection processing module 220. The signal-matching module 218 also analyzes the return signals to resolve detections by the lidar system 102 and map the return signals to their corresponding pixels within the field-of-view 106. The signal-matching module 218 can also provide feedback to the transceiver 212 to configure the transmission of lidar signals. For example, the signal-matching module 218 can provide feedback data to the transceiver 212 to control the modulation (e.g., shape, frequency, amplitude, phase) of the transmit signals.

The detection processing module 220 analyzes the data output by the signal-matching module 218 and produces lidar data for the vehicle-based systems 202. Example types of lidar data include a Boolean value that indicates whether a detection from the object 108 is present within a particular region of interest, a number that represents a characteristic of the object 108 (e.g., range, range-rate, radial velocity, angular information), or a value that indicates the type of object 108 (e.g., a moving object 110, a stationary object 112, a living object, a non-living object).

FIG. 3-1 illustrates an example operation of the lidar system 102 that resolves return signals among pixels. For reference, the lidar system 102 includes the field-of-view 106, which shows the pixels 306-11, 306-21, 306-31, ..., 306-X1, ..., 306-XY, 306-3Y, 306-2Y, 306-1Y, and all other pixels scanned during a frame. The pixels 306 are shown arranged in an X-pixel-wide-by-Y-pixel-high grid and are scanned individually in the order indicated by the arrows, one row (or column) at a time.

In the environment 300 of FIG. 3-1, objects 108-1, 108-2, and 108-3 (collectively, the objects 108) are located at a particular range and angle from the lidar system 102. To detect the objects 108, the lidar system 102 transmits a transmit signal 302. As an example, the lidar system 102 emits a transmit signal 302-11, which is a portion of the transmit signal 302, in the pixel 306-11. The transmit signal 302-11 has a first amplitude modulation.

Similarly, the lidar system 102 emits the transmit signals 302-21 and 302-31 in the pixels 306-21 and 306-31, respectively. The transmit signals 302-11 to 302-31 are collectively the transmit signal 302. The transmit signals 302-21 and 302-31 have a second amplitude modulation and a third amplitude modulation, respectively. The second amplitude modulation is different than both the first amplitude modulation (applied to the transmit signal 302-11) and the third amplitude modulation (applied to the transmit signal 302-21). The third amplitude modulation can be the same or different than the first amplitude modulation. In other words, the first amplitude modulation can be reused for another pixel within a frame, but the amplitude modulations used for consecutive pixels are different. The amplitude modulation applied to the transmit signals 302 provide a different waveform for consecutive pixels to assist in resolving return signals among pixels. The lidar system 102 can apply different types of waveforms to consecutive pixels by, for example, varying the phase modulation, frequency modulation, amplitude modulation, or any combination thereof.

Each transmit signal 302 can include one or more chirps. A chirp is a portion of the transmit signal 302 in which the frequency increases (up-chirp), decreases (down-chirp), or remains constant (flat-chirp) over time. In the depicted example, the lidar system 102 employs a single up-chirp for each transmit signal 302 within a single pixel 306, with the frequency of each chirp linearly increasing over time. In other cases, the lidar system 102 can apply a triangle-slope cycle with two chirps for each transmit signal 302 within a pixel 306, in which the frequency of each chirp alternates between linearly increasing and linearly decreasing over time. In general, the lidar system 102 can tailor the number of chirps for each of the transmit signals 302 and the transmission characteristics of the chirps (e.g., bandwidth, center frequency, duration, transmit power) to achieve a particular detection range, range resolution, or Doppler resolution.

As discussed above, the beam-steering components 210 steer each transmit signal 302 so that the lidar system 102 sequentially scans the pixels 306 within the field-of-view 106. In other words, the lidar system 102 transmits the transmit signals 302-11 to 302-31 in a continuous sequence and not as a series of discrete signals. A frame (not shown) represents the time it takes to scan all the individual pixels 306 within the field-of-view 106.

At least a part of the transmit signal 302-11 is reflected by the object 108-1. The reflected portion represents a return signal 304-11. The lidar system 102 receives the return signal 304-11 and processes the return signal 304-11 to extract lidar data regarding the object 108-1 for the vehicle-based systems 202. As depicted, the amplitude of the return signal 304-11 is smaller than the amplitude of the transmit signal 302-11 due to losses incurred during propagation and reflection.

Similarly, at least a portion of the transmit signals 302-21 and 302-31 are reflected by the objects 108-2 and 108-3, respectively. The lidar system 102 receives the return signals 304-21 and 304-31 and processes the return signals 304-21 and 304-31 to extract lidar data regarding the objects 108-2 and 108-3 for the vehicle-based systems 202. The return signals 304-11 to 304-31 are collectively the return signal 304.

At the lidar system 102, the return signals 304-11 to 304-31 represent a delayed version of the transmit signals 302-11 to 302-31, respectively. The amount of delay is proportional to the range (e.g., distance) from the objects 108-1 to 108-3 to the lidar system 102. For example, this delay represents the time it takes the transmit signal 302-11 to propagate from the lidar system 102 to the object 108-1 and for the return signal 304-11 to travel back to the lidar system 102. If the objects 108 or the lidar system 102 are moving, the return signals 304 are shifted in frequency relative to the transmit signal 302 due to the Doppler effect. This shift in the frequency of the return signals 304 is known as the Doppler frequency. In other words, characteristics of the return signals 304 are dependent upon motion of the objects 108, respectively, or motion of the vehicle 104. Similar to the transmit signals 302, the return signals 304 are composed of one or more chirps. This document further describes the characteristics of the transmit signals 302 and the return signals 304 with respect to FIG. 3-2.

FIG. 3-2 illustrates a frequency-time plot 310 of the transmit signal 302 and the return signal 304 for the pixels 306 of the lidar system 102 of FIG. 3-1. In the frequency-time plot 310, the vertical axis represents frequency and the horizontal axis represents time. The frequency-time plot 310 illustrates the transmit signal 302 and the return signal 304 for a single frame.

The frequency-time plot 310 depicts multiple pixels 306 and multiple detection windows Ti. In general, each detection window $T_1$ is associated with a particular pixel 306. For example, the detection windows $T_{i11}$, $T_{i21}$, and $T_{i31}$ are associated with the pixels 306-11, 306-21, and 306-31, respectively. In the depicted example, the detection window $T_{i11}$ occurs during a time that a portion of the transmit signal 302-11 is transmitted and a portion of the transmit signal 302-12 is transmitted. The duration for each detection window $T_i$ is sufficient to enable the lidar system 102 to receive reflections for a particular detection range. During each detection window $T_1$, the transceiver 212 collects samples of the return signal 304. As described above with respect to FIG. 3-1, these return signals 304 represent reflections of the transmit signal 302 for the associated pixel 306 or reflections of the transmit signal 302 associated with a neighboring pixel 306.

During a frame, the lidar system 102 receives the return signal 304-11 during a detection window $T_{i11}$, obtaining characteristics (e.g., range information, range-rate information, angular information) of the object 108-1 for the pixel 306-11. The lidar system 102 subsequently receives the return signal 304-21 and the return signal 304-31, obtaining characteristics of the object 108-2 and the object 108-3 for the pixel 306-21 and the pixel 306-31, respectively. For example, the lidar system 102 can determine angular information of the object 108 (e.g., the object 108-2) based on the angle associated with the corresponding pixel 306 (e.g., the pixel 306-2). As discussed in more detail with respect to FIG. 5-1, the lidar system 102 determines a beat frequency ($f_b$) for the return signals 304. The lidar system 102 can use the beat frequency to obtain range and/or range-rate information for the pixels 306, as presented in the following equations. In these equations, R is range (e.g., distance) to the object 108, v is range-rate (e.g., radial velocity) of the object 108, c is the speed of light, $f_c$ is the frequency of the transmit signal 302 (e.g., the carrier frequency), T is the period of the pixel 306, and B is the bandwidth of the pixel 306. Accordingly:

the Doppler frequency is:

$$f_D = 2*v*\frac{f_c}{c} \qquad \text{Eq. 1}$$

the beat frequency is:

$$f_b = 2*\frac{R*B}{c*T} - f_D \qquad \text{Eq. 2}$$

For each of the pixels 306, the lidar system 102 processes the return signal 304 to determine the beat frequency. For example, the return signal 304-11 is received during the detection window $T_{i11}$. The process repeats for each of the pixels 306 in the field-of-view 106. In this example, the return signal 304-11 is received during the detection window $T_{i11}$, which corresponds to the pixel 306-11, and the beginning portion of the detection window $T_{i21}$, which corresponds to the pixel 306-21. During the latter portion of the detection window $T_{i21}$ and the beginning portion of the detection window $T_{i31}$, the lidar system 102 receives both the return signal 304-21 and the return signal 304-31. The return signals 304-21 and 304-31 can overlap because the object 108-2, which reflected the return signal 304-21, is farther away from the lidar system 102 than the object 108-3, which reflected the return signal 304-31.

Figure 4:
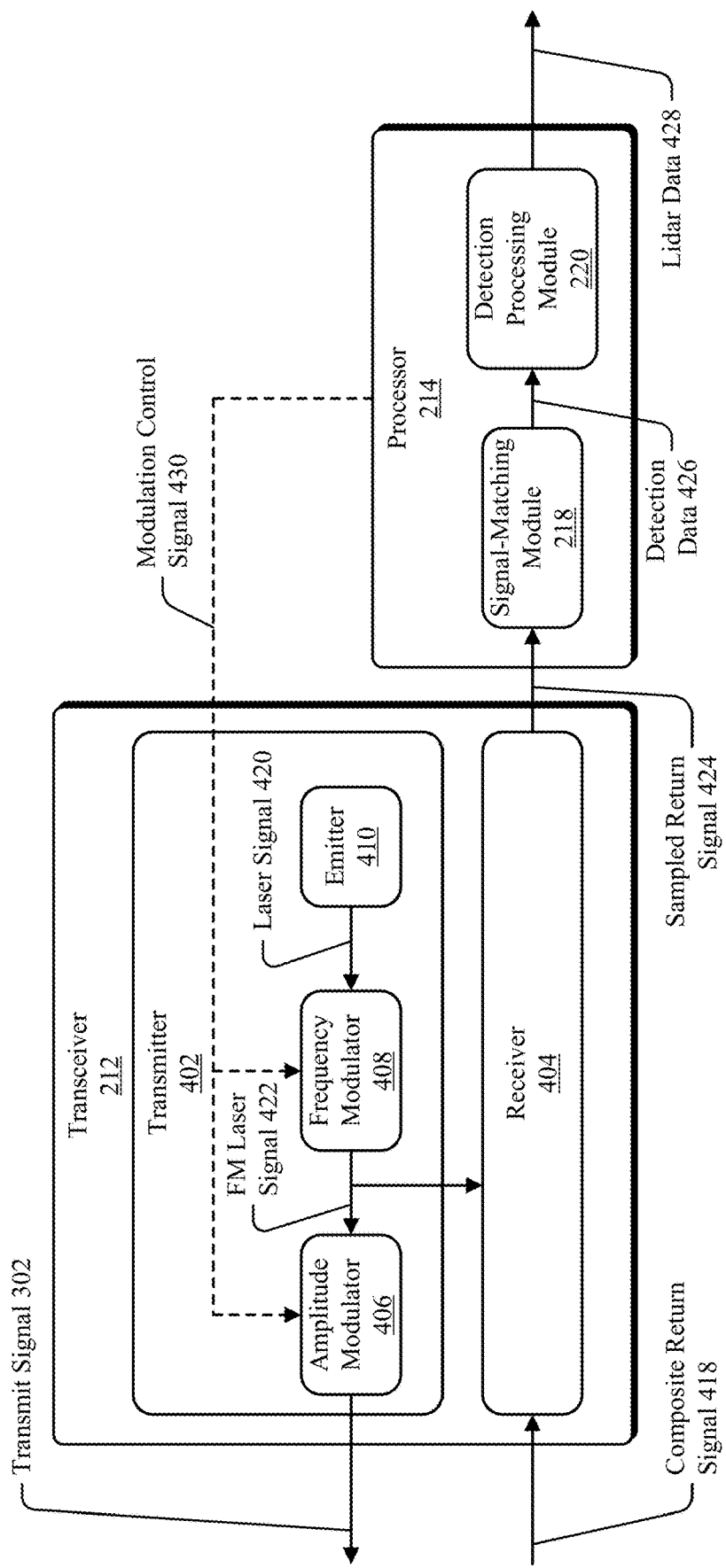
FIG. 4 illustrates an example transceiver and processor of the described FMCW lidar system.

In such situations where multiple return signals 304 for different pixels 306 are received at the same time, the linearly-increasing frequency of the transmit signal 302 (as shown in FIG. 3-2) allows the beat frequency of the return signals 304 to be correctly determined via the mixing operation in the receiver 404, which is discussed with respect to FIG. 4.

The detection window $T_i$ may include return signals 304 from a single pixel (e.g., the pixel 306-21) or consecutive pixels (e.g., the pixels 306-21 and 306-31). In other words, a single detection window $T_i$ can span a portion of time in which a current transmit signal 302 is transmitted and a portion of a subsequent transmit signal 302 is transmitted. In other implementations, the detection windows $T_i$ can be lengthened to listen for return signals 304 for larger groups of consecutive pixels. For example, the detection window $T_{i11}$ can be lengthened to listen for return signals 304 for the pixels 306-11 to 306-31. In other words, the single detection window $T_i$ can span a portion of time that the current transmit signal 302 is transmitted and a portion of time that two or more subsequent transmit signals 302 are transmitted. The signal-matching module 218 (of FIG. 2) can match each return signal 304 to its corresponding pixel 306, as further described with respect to FIG. 4.

FIG. 4 illustrates an example transceiver 212 and an example processor 214 of the described lidar system 102. In the depicted configuration, the transceiver 212 is coupled between the beam-steering components 210 (of FIG. 2) and the processor 214. The processor 214 implements the signal-matching module 218 and the detection processing module 220. The processor 214 is connected to a data path of the return signal 304.

The transceiver 212 includes at least one transmitter 402 and at least one receiver 404. The transmitter 402 generates the transmit signal 302 and passes the transmit signal 302 to the beam-steering components 210. The transmitter 402 includes at least one amplitude modulator 406, at least one frequency modulator 408, and at least one emitter 410. The emitter 410 includes a laser or similar component, which generates an optical signal. The emitter 410 is coupled to the frequency modulator 408.

The frequency modulator 408 performs frequency modulation to enable the lidar system 102 to operate as a FMCW lidar system. In some cases, the frequency modulator 408 varies the frequency modulation for transmit signals 302 that are associated with different pixels 306. Consider the example transmit signals 302-11 to 302-31 in FIG. 3-2. In this case, the frequency modulator 408 causes the frequency across the set of transmit signals 302-11 to 302-31 to linearly increase over time. In other words, the frequency modulator 408 causes the transmit signal 302-31 to have a higher center frequency than a center frequency of the transmit signal 302-21 and causes the center frequency of the transmit signal 302-21 to be higher than a center frequency of the transmit signal 302-11. The frequency modulator 408 also causes the frequencies of the individual transmit signals 302-11, 302-21, and 302-31 to increase at the same rate (e.g., the same frequency-time slope). If the transmit signal 302 includes multiple chirps, the frequency modulator 408 can also vary the frequency modulation for different chirps that are associated with the same pixel 306.

The amplitude modulator 406 is coupled to the frequency modulator 408 and applies a unique amplitude modulation scheme to enable detections to be resolved for different return signals 304 among the pixels 306. The amplitude modulator 406 can vary the amplitude modulation for transmit signals 302 that are associated with different pixels 306. If the transmit signal 302 includes multiple chirps, the amplitude modulator 406 can also vary the amplitude modulation for different chirps that are associated with the same pixel 306. In other implementations, the amplitude modulator 406 can be implemented as another type of modulator 406 that provides amplitude modulation, frequency modulation, phase modulation, or any combination thereof to generate unique waveforms for consecutive pixels 306.

The receiver 404 receives and conditions a composite return signal 418 for the processor 214. The composite return signal 418 includes at least one of the return signals 304 of FIGS. 3-1 and 3-2. Although not explicitly shown, the receiver 404 can include a photo-detector and other receiver elements, such as an amplifier, a mixer, a filter, and an analog-to-digital converter.

During operation, the emitter 410 generates a laser signal 420, which can have a steady (e.g., constant) frequency. The frequency modulator 408 modulates the frequency of the laser signal 420 to generate a frequency-modulated (FM) laser signal 422. The amplitude modulator 406 modulates the amplitude of the frequency-modulated laser signal 422 to generate the transmit signal 302, which has a particular amplitude modulation that is associated with its corresponding pixel 306.

The transmit signal 302 propagates through space and is reflected by the object 108 (e.g., one of the objects 108-1 to 108-3 depicted in FIG. 3-1). The receiver 404 receives the reflected version of the transmit signal 302, which is represented by the composite return signal 418. The receiver 404 mixes the composite return signal 418 with the FM laser signal 422 to downconvert and demodulate the frequency of the composite return signal 418. The receiver 404 generates a sampled return signal 424, which is a time-domain digital signal.

The processor 214 accepts the sampled return signal 424 and analyzes the sampled return signal 424 to generate lidar data 428. In particular, the processor 214 executes the signal-matching module 218 and the detection processing module 220. The signal-matching module 218 performs one or more operations to associate the return signal 304 to its corresponding pixel 306. The signal-matching module 218 passes detection data 426 to the detection processing module 220. The detection data 426 can include each of the sampled return signals 424 and an indication of its corresponding pixel 306. The detection processing module 220 analyzes the detection data 426 and generates the lidar data 428. The lidar data 428 can include range and/or range-rate information or angular information of the object 108 that reflected the return signal 304. In other cases, the lidar data 428 indicates whether an object 108 is in a blind spot of the vehicle 104.

The processor 214 provides the lidar data 428 to the vehicle-based systems 202 (of FIG. 2).

In some situations, the processor 214 outputs a modulation control signal 430 to the amplitude modulator 406 or the frequency modulator 408. The processor 214 directs the amplitude modulator 406 or the frequency modulator 408 to apply a particular modulation to the transmit signal 302 associated with a subsequent pixel 306. The modulation control signal 430 can be output by different components, including, for example, the signal-matching module 218, the detection processing module 220, or the receiver 404. In addition, the modulation applied by the amplitude modulator 406 and the frequency modulator 408 can be programmed to cycle through different modulations without receiving the modulation control signal 430. By changing the amplitude modulation applied by the amplitude modulator 406 based on the associated pixel 306, the signal-matching module 218 can resolve return signals among different pixels 306, as further described with respect to FIG. 5-1.

Figures 1, 5:
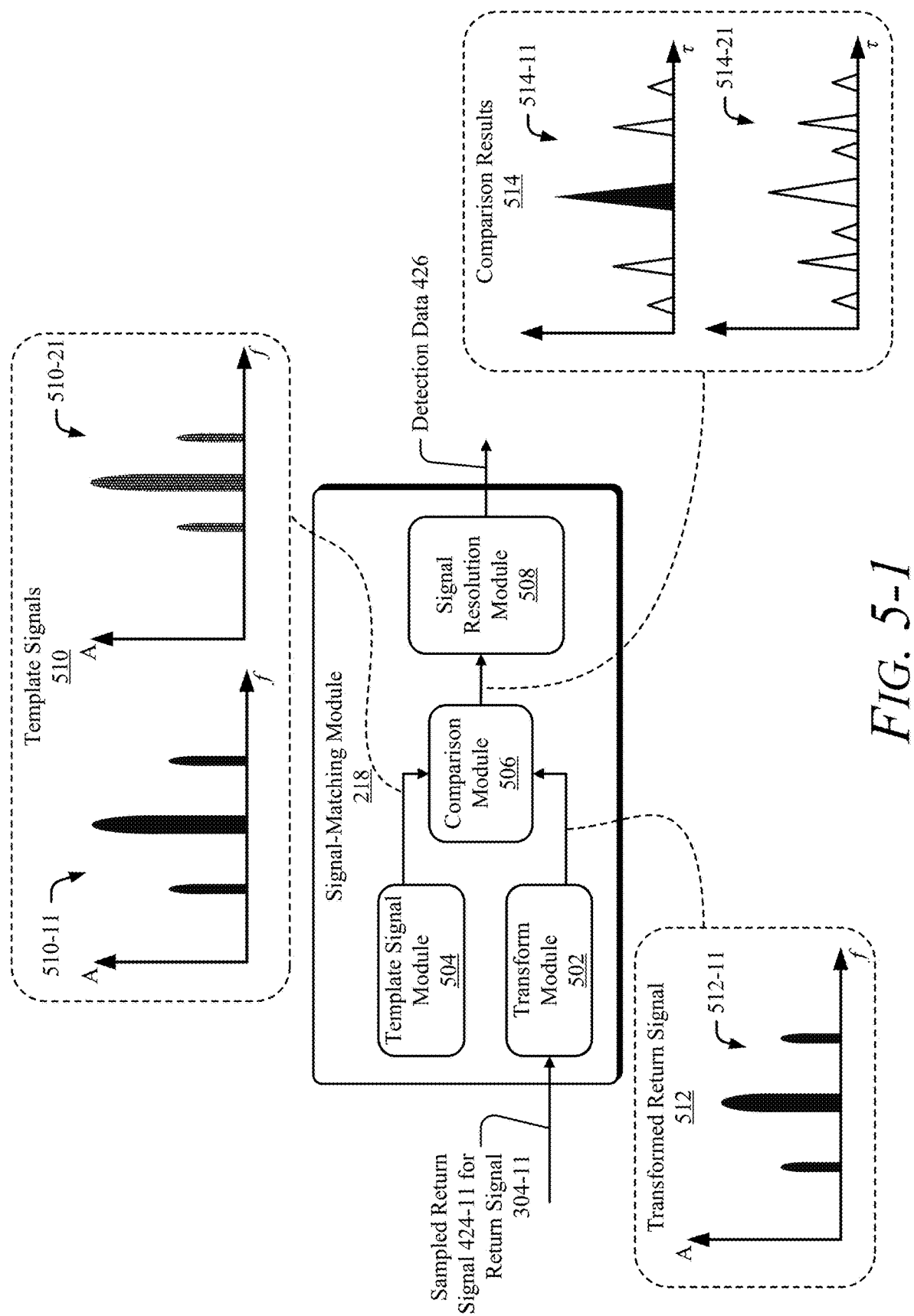
Figures 2, 5:
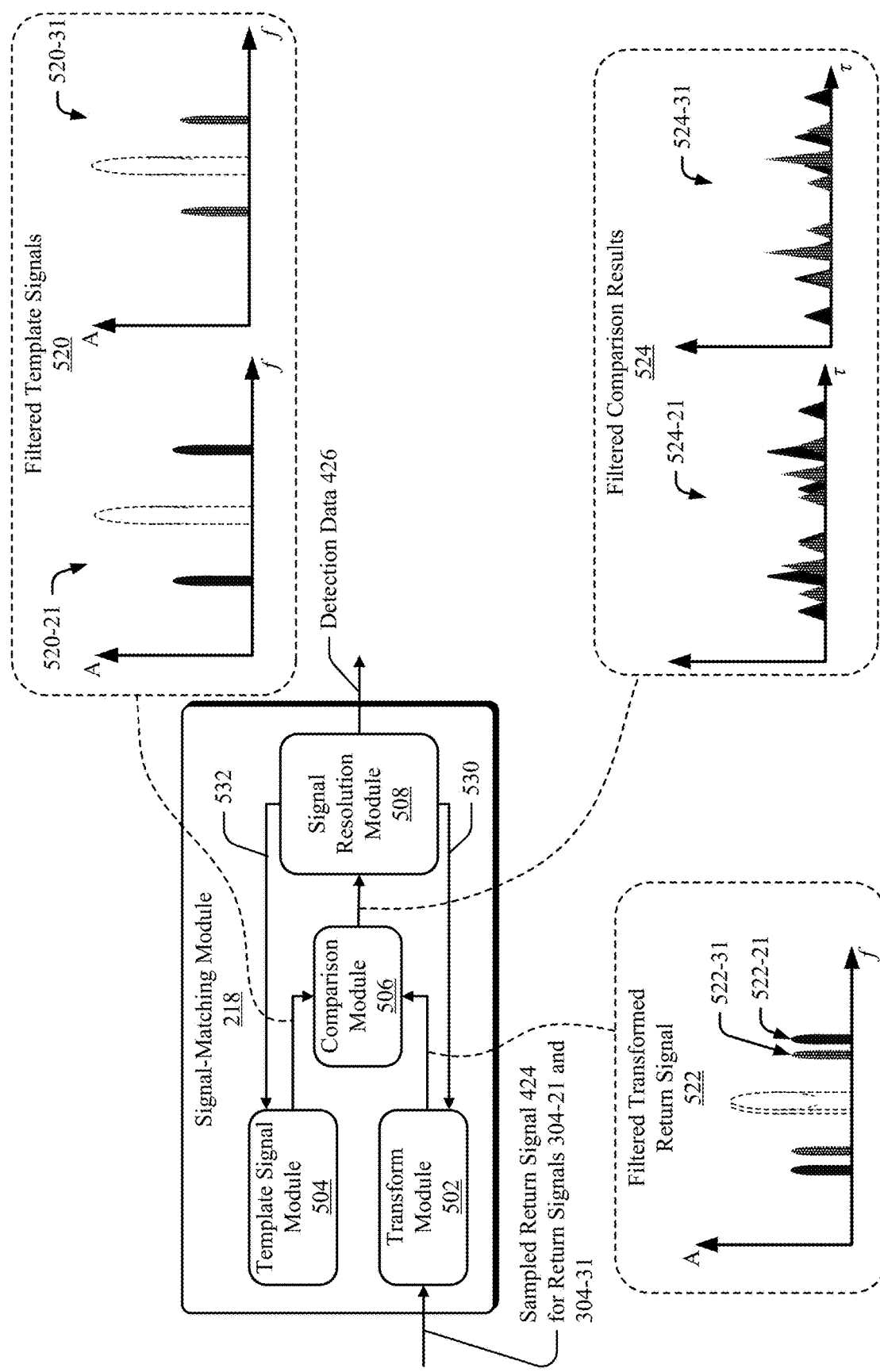

FIG. 5-1 illustrates an example signal-matching module 218 of the described lidar system 102. The signal-matching module 218 includes a transform module 502, a template signal module 504, a comparison module 506, and a signal resolution module 508.

In the depicted example, the lidar system 102 receives the return signal 304-11 during the detection window $T_{i11}$, which corresponds to the pixel 306-11. The transform module 502 accepts the sampled return signal 424-11 associated with the return 304-11 and generates a transformed return signal 512-11. The transform module 502 transforms the sampled return signal 424 associated with the return signal 304 into the frequency domain. As an example, the transform module 502 performs a Fourier transform, such as a fast Fourier transform, of the composite return signal 418. In the depicted implementation, the transform module 502 performs a Fourier transform on the sampled return signal 424-11 to generate a transformed return signal 512-11. The transformed return signal 512-11 provides the frequencies and amplitudes of the sampled return signal 424-11. The transformed return signal 512 is provided as an input to the comparison module 506.

The template signal module 504 generates template signals 510 in the frequency domain. The template signals 510 have the same side bands as the transmit signal 302 of the pixel(s) corresponding to the current detection window $T_i$ (e.g., the pixel 306-11), the subsequent pixel (e.g., pixel 306-21), and/or the previous pixel (not explicitly shown in FIG. 3-2). In the depicted example, the template signal module 504 generates template signals 510-11 and 510-21 in the frequency domain. The template signal 510-11 has the same side bands as the transmit signal 302-11, and the template signal 510-21 has the same side bands as the transmit signal 302-21. In this case, the amplitude modulation determines frequency offset of the side bands in the template signals 510. The template signal module 504 outputs the template signals 510 to the comparison module 506.

The comparison module 506 compares the transformed return signal 512 to the template signals 510 to generate comparison results 514. The comparison module 506 can utilize a cross-correlation, convolution, or match-filtering method to compare the transformed return signal 512 to the template signals 510 in the frequency domain. In the depicted example, the comparison module 506 compares the transformed return signal 512-11 to the template signals 510-11 and 510-21 to generate the comparison results 514-11 and 514-21. The comparison module 506 outputs the comparison results 514 to the signal resolution module 508.

Based on the comparison results 514, the signal resolution module 508 determines to which of the pixels 306 the return signal 304 corresponds. For example, the signal resolution module 508 compares a maximum peak of the comparison result 514-11 to a maximum peak of the comparison result 514-21 and identifies the largest peak among the comparison results 514. In the depicted example, the comparison result 514-11 has the largest peak. Accordingly, the signal resolution module 508 associates the return signal 304-11 to the pixel 306-11.

The signal resolution module 508 can also identify the frequency of the largest peak, which represents the beat frequency of the return signal 304-11. As described with respect to FIG. 3-2, the lidar system 102 can then compute the range information, range-rate information, and/or angular information associated with object 108-1 based on the beat frequency of the return signal 304-11.

The signal resolution module 508 can confirm that the return signal 304-11 corresponds to the pixel 306-11 by evaluating sidebands in the comparison result 514-11. The signal resolution module 508 compares the offset between the largest peak and the sideband peaks in the comparison result 514-11 to the sideband offset in the template signal 510-11. In the depicted example, the sideband peaks occur in the comparison result 514-11 at the same offset as they occur in the template signal 510-11. In some situations, the signal resolution module 508 performs additional operations to resolve ambiguities in associating the return signals 304 to their corresponding pixels 306, as further described with respect to FIG. 5-2.

FIG. 5-2 illustrates another example implementation of the signal-matching module 218 with feedback. In this example implementation, the signal resolution module 508 provides a feedback signal 530 to the transform module 502 and a feedback signal 532 to the template signal module 504. The feedback is provided to resolve ambiguities in associating the return signals 304 to their corresponding pixels 306. These ambiguities can occur if the beat frequencies of two returns signals 304 are approximately the same and the sideband peaks of the return signals are near each other. As a result, it can be difficult to confirm which return signal 304 corresponds to which pixel 306 because of the peak amplitudes in the comparison results 514 being similar for the different return signals 304.

During operation, the transform module 502 accepts sampled return signals 424-21 and 424-31, which were received by the transceiver 212 as the composite return signal 418 during the detection window $T_{i31}$ and correspond to the return signals 304-21 and 304-31, as shown in FIG. 3-2. The transform module 502 generates, using a Fourier transform, transformed return signals 512-21 and 512-31 (not shown in FIG. 5-2) in the frequency domain. The template signal module 504 generates template signals 510-21 and 510-31 in the frequency domain. The comparison module 506 compares the transformed return signals 512-21 and 512-31 to the template signals 510-21 and 510-31 to generate comparison results 514 (not shown). The signal resolution module 508 then associates, based on the largest peak in the comparison results 514, the return signal 304-21 to the template signal 510-21 and the return signal 304-31 to the template signal 510-31. In this example, the beat frequency associated with the return signals 304-21 and 304-31 are substantially equal and their associated beat frequencies are near each other, which can occur when the objects 108 that reflected the returns signals 304 are a similar distance away from the lidar system 102.

The signal resolution module 508 can determine that the composite return signal 418 contains multiple return signals 304 (e.g., the return signal 304-21 and 304-31) by, for example, determining that there are multiple peak amplitudes in the comparison results 514 that are above a threshold value. These multiple return signals 304 can be associated with the same pixel 306 or different pixels 306. The signal resolution module 508 can also determine the presence of multiple return signals 304 by identifying multiple pairs of sideband peaks, which indicates that a specific beat frequency exists for each pair of sideband peaks.

The signal resolution module 508 can confirm that the return signal 304-21 corresponds to the pixel 306-21 and that the return signal 304-31 corresponds to the pixel 306-31 by performing the comparison process again with the beat frequency filtered out. Filtering out the beat frequency results in only the sideband peaks—not the beat frequencies—contributing to the comparison results generated by the comparison module 506.

The signal resolution module 508 provides the feedback signal 530 to the transform module 502 and the feedback signal 532 to the template signal module 504. Responsive to accepting the feedback signal 530, the transform module 502 generates a filtered transformed return signal 522 by filtering out the beat frequencies of the return signals 304-21 and 304-31 within the composite return signal 418. The filtered transformed return signals 522-21 and 522-31 share approximately the same beat frequency, which is represented by the double-set of dashed lines in the center of the pairs of the sideband peaks. The side bands of the filtered transformed return signal 522-21 are represented as solid black in FIG. 5-2 and the side bands of the filtered transformed return signal 522-31 are represented by the white-speckled pattern.

The template signal module 504 generates filtered template signals 520-21 and 520-31 by filtering out the beat frequency of the transmit signals 302-21 and 302-31. In FIG. 5-2, the center frequency of the filtered template signals 520 are represented as a dashed line to indicate that these frequencies have been filtered out.

The comparison module 506 then compares the filtered transformed return signal 522, which includes the filtered transformed return signals 522-21 and 522-31, with the filtered template signals 520-21 and 520-31 to generate filtered comparison results 524-21 and 524-31. The filtered comparison result 524-21 is the output of comparing the filtered transformed return signal 522-21 with the filtered template signal 520-21 in the frequency domain. The filtered comparison result 524-31 is the output of comparing the filtered transformed return signal 522 with the filtered template signal 520-31 in the frequency domain. In FIG. 5-2 the filtered comparison results 524 corresponding to the return signal 304-21 are represented by solid-black triangles and the filtered comparison results 524 corresponding to the return signal 304-31 are represented by the white-speckled triangles. The signal resolution module 508 then associates, based on the largest peak for each pair of side bands in the filtered comparison results 524, the return signal 304-21 to the filtered template signal 520-21 and the return signal 304-31 to the filtered template signal 520-31. For example, the pair of side band peaks with the largest amplitude in the filtered comparison result 524-21 are offset from each other by a similar amount as the side bands in the filtered template signal 520-21, which is associated with the transmit signal 302-21, the return signal 304-21, and the pixel 306-21.

Likewise, the pair of side band peaks with the largest amplitude in the filtered comparison result 524-31 are offset from each other by a similar amount as the side bands in the filtered template signal 520-31, which is associated with the transmit signal 302-31, the return signal 304-31, and the pixel 306-31.

As described with respect to FIG. 3-2, the lidar system 102 can then compute the range and range-rate information or the angular information associated with the objects 108 based on the beat frequencies of the return signals 304-21 and 304-31.

In other cases, the beat frequency associated with the return signal 304-21 can overlap with a side band of the return signal 304-31. In such cases, the signal resolution module 508 can similarly confirm that the return signal 304-21 corresponds to the pixel 306-21 and that the return signal 304-31 corresponds to the pixel 306-31 by performing the comparison process again with the beat frequency filtered out.

Example Method

Figure 6:
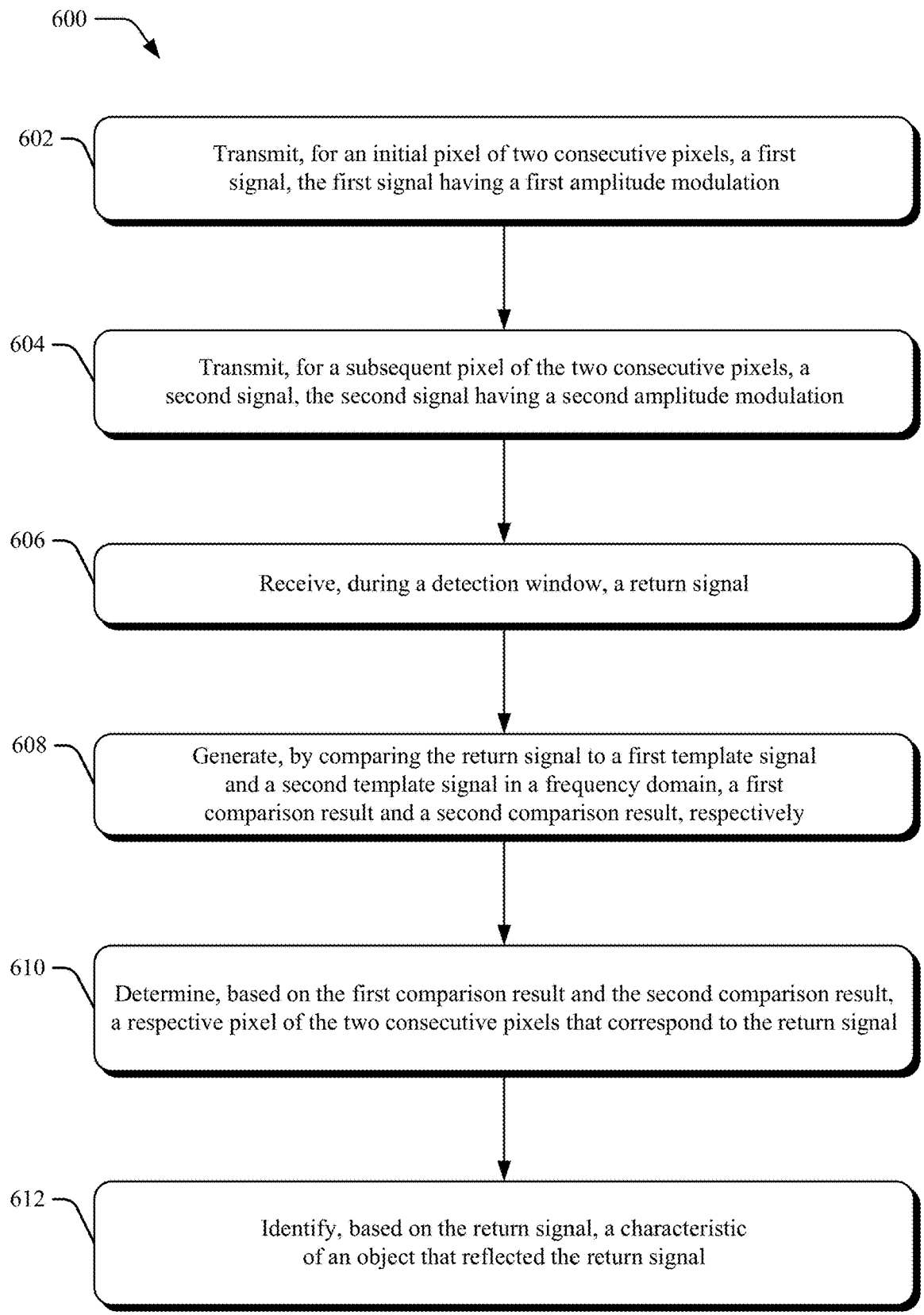
FIG. 6 illustrates an example process performed by a FMCW lidar system that resolves return signals among pixels.

FIG. 6 depicts an example method 600 performed by a FMCW lidar system that resolves return signals among pixels. Method 600 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environments 100 and 300 of FIGS. 1 and 3-1, respectively, and entities detailed in FIGS. 2, 4, and 5-1, reference to which is made for example only. The techniques are not limited to performance by one entity or multiple entities.

At 602, a first signal is transmitted for an initial pixel of two consecutive pixels. The first signal has a first amplitude modulation. For example, the transmitter 402 of the lidar system 102 on the vehicle 104 transmits, for the pixel 306-11 of the consecutive pixels 306-11 and 306-21, the transmit signal 302-11, as shown in FIG. 3-1. The transmit signal 302-11 has a first amplitude modulation.

At 604, a second signal is transmitted for a subsequent pixel of the two consecutive pixels. The second signal has a second amplitude modulation, which is different than the first amplitude modulation. For example, the transmitter 402 of the lidar system 102 transmits, for the pixel 306-21, the transmit signal 302-21, as shown in FIG. 3-1. The transmit signal 302-21 has a second amplitude modulation, which is different than the first amplitude modulation. The first signal (e.g., the transmit signal 302-11) and the second signal (e.g., the transmit signal 302-21) are emitted in a continuous sequence (e.g., are part of the same transmit signal) and are not discrete signals.

At 606, a return signal is received during a detection window. At least a portion of the first signal and the second signal is transmitted during the detection window. For example, the receiver 404 of the lidar system 102 receives, during the detection window Till corresponding to the pixel 306-11, the return signal 304-11, as shown in FIG. 3-2. A portion of the transmit signal 302-11 and the transmit signal 302-21 is transmitted during the detection window $T_{i11}$. In other examples, the detection window $T_{i11}$ can correspond to two or more pixels (e.g., the pixels 306-11 and 306-21).

At 608, a first comparison result and a second comparison result are generated, by comparing the return signal to a first template signal and a second template signal in a frequency domain, respectively. The first template signal has the first amplitude modulation and the second template signal has the second amplitude modulation. For example, the signal-matching module 218 of the lidar system 102 generates the template signal 510-11 and the template signal 510-21, as shown in FIG. 5-1. The template signal 510-11 has the first amplitude modulation, which was applied to the transmit signal 302-11 and is associated with the pixel 306-11. The template signal 510-21 has the second amplitude modulation, which was applied to the transmit signal 302-21 and is associated with the pixel 306-21. The signal-matching module 218 generates, by comparing in the frequency domain the return signal 304-11 with the template signal 510-11 and the template signal 510-21, the comparison result 514-11 and the comparison result 514-21. The comparison result 514-11 is associated with the template signal 510-11 and the pixel 306-11. The comparison result 514-21 is associated with the template signal 510-21 and the pixel 306-21.

At 610, a respective pixel of the two consecutive pixels that corresponds to the return signal is determined, based on the first comparison result and the second comparison result. For example, the signal-matching module 218 of the lidar system 102 determines that, among the comparison results 514, the comparison result 514-11 has the largest peak value. The signal-matching module 218, therefore, determines that the pixel 306-11 corresponds to the return signal 304-11, as shown in FIG. 5-1.

At 612, a characteristic of an object that reflected the return signal is identified, based on the return signal and a transmitted signal of the respective pixel corresponding to the return signal. For example, the detection processing module 220 identifies, based on the return signal 304-11 and the transmit signal 302-11 of the pixel 306-11, a characteristic of the object 108-1 (e.g., range information, range-rate information, angular information) that reflected the return signal 304-11, as shown in FIG. 3-2.

Examples

In the following section, examples are provided.

Example 1: A method performed by a lidar system comprising: transmitting, for an initial pixel of two consecutive pixels, a first transmit signal, the first transmit signal having a first amplitude modulation; transmitting, for a subsequent pixel of the two consecutive pixels, a second transmit signal, the second transmit signal having a second amplitude modulation, the second amplitude modulation different than the first amplitude modulation; receiving, during a detection window and in which at least a portion of the first transmit signal and the second transmit signal are transmitted, a return signal; generating, by comparing in a frequency domain the return signal to a first template signal and a second template signal, a first comparison result and a second comparison result, respectively, the first template signal having the first amplitude modulation, the second template signal having the second amplitude modulation; determining, based on the first comparison result and the second comparison result, a respective pixel of the two consecutive pixels that corresponds to the return signal; and identifying, based on the return signal, a characteristic of an object that reflected the return signal, the object located within an area associated with the respective pixel.

Example 2: The method of example 1 further comprising: receiving, during the detection window, a second return signal, the return signal and the first return signal forming a composite return signal; wherein the generating of the first comparison result and the second comparison result comprises generating, by comparing in the frequency domain the composite return signal to the first template signal and the second template signal, a first comparison result and a second comparison result, respectively; wherein the determining of the respective pixel of the two consecutive pixels that corresponds to the return signal comprises determining, based on the first comparison result and the second comparison result, the respective pixel of the two consecutive pixels that corresponds to the return signal and a second respective pixel of the two consecutive pixels that corresponds to the second return signal; and identifying, based on the second return signal, a characteristic of a second object that reflected the second return signal, the second object located within an area associated with the second respective pixel.

Example 3: The method of example 2, wherein: the return signal is a reflected version of the first transmit signal and the respective pixel corresponding to the return signal is the initial pixel; and the second return signal is a reflected version of the second transmit signal and the second respective pixel corresponding to the second return signal is the subsequent pixel.

Example 4: The method of example 2, further comprising: determining, based on the comparison result corresponding to the respective pixel of the return signal, a beat frequency of the return signal; determining, based on the comparison result corresponding to the second respective pixel of the second return signal, a beat frequency of the second return signal; determining that the beat frequency of the return signal and the beat frequency of the second return signal are substantially equal; generating a filtered return signal, a first filtered template signal, and a second filtered template signal by filtering the beat frequencies of the return signal and the second return signal, a center frequency of the first template signal, and a center frequency of the second template signal, respectively; generating, by comparing in the frequency domain the filtered return signal with the first filtered template signal and the second filtered template signal, a first filtered comparison result and a second filtered comparison result; and confirming, based on the first filtered comparison result and the second filtered comparison result, the respective pixel of the two consecutive pixels corresponding to the first filtered return signal and the second respective pixel of the two consecutive pixels corresponding to the second filtered return signal.

Example 5: The method of example 1, wherein the comparing in the frequency domain of the return signal to the first template signal and the second template signal comprises: generating the first template signal in a frequency domain and the second template signal in the frequency domain; generating a Fourier transform of the return signal; and comparing the Fourier transform of the return signal to the first template signal and to the second template signal.

Example 6: The method of example 5, wherein the comparing of the Fourier transform of the return signal to the first template signal and to the second template signal comprises performing a cross-correlation, a convolution, or a match-filtering method.

Example 7: The method of example 1, wherein the determining of the respective pixel of the two consecutive pixels corresponding to the return signal comprises: determining, among the first comparison result and the second comparison result, a largest peak value and a frequency of the largest peak value, wherein the frequency of the largest peak value is a beat frequency of the return signal; and identifying a template signal used to generate a comparison result associated with the largest peak value, the template signal among the first template signal and the second template signal and associated with the largest peak value and the comparison result among the first comparison result and the second comparison result.

Example 8: The method of example 7, wherein: the first template signal has first side bands corresponding to the first amplitude modulation; the second template signal has second side bands corresponding to the second amplitude modulation; and the method further comprising comparing frequency offsets of the side bands of the template signal associated with the largest peak value with the first side bands and the second side bands.

Example 9: The method of example 1, wherein the characteristic of the object comprises at least one of the following: a distance from the lidar system to the object; or a radial velocity of the object relative to the lidar system.

Example 10: The method of example 9, further comprising determining an angle between the lidar system and the object based on an angular position of the respective pixel.

Example 11: The method of example 1, wherein the first transmit signal comprises one or more first chirps and the second transmit signal comprises one or more second chirps.

Example 12: The method of example 1, further comprising: transmitting, for another subsequent pixel of three consecutive pixels, a third transmit signal, the third transmit signal having a third amplitude modulation, the third amplitude modulation different than both the first amplitude modulation and the second amplitude modulation, the three consecutive pixels including the two consecutive pixels.

Example 13: A lidar system comprising at least one processing unit configured to: accept a return signal from a receiver of the lidar system, the return signal received during a detection window in which at least a portion of a first transmit signal and at least a portion of a second transmit signal are transmitted by the lidar system, the first transmit signal having a first amplitude modulation, the second transmit signal having a second amplitude modulation that is different than the first amplitude modulation; generate, by comparing in a frequency domain the return signal to a first template signal and a second template signal, a first comparison result and a second comparison result, respectively, the first template signal having the first amplitude modulation, the second template signal having the second amplitude modulation; determine, based on the first comparison result and the second comparison result, a respective pixel of the two consecutive pixels that corresponds to the return signal; and identify, based on the return signal, a characteristic of an object that reflected the return signal, the object located within an area associated with the respective pixel.

Example 14: The lidar system of example 13, wherein the at least one processing unit is further configured to: accept a second return signal from the receiver, the second return signal received during the detection window, the return signal and the first return signal forming a composite return signal; in generating of the first comparison result and the second comparison result, generate, by comparing in the frequency domain the composite return signal to the first template signal and the second template signal, a first comparison result and a second comparison result, respectively; in determining of the respective pixel of the two consecutive pixels that corresponds to the return signal, determine, based on the first comparison result and the second comparison result, the respective pixel of the two consecutive pixels that corresponds to the return signal and a second respective pixel of the two consecutive pixels that corresponds to the second return signal; and identify, based on the second return signal, a characteristic of a second object that reflected the second return signal, the second object located within an area associated with the second respective pixel.

Example 15: The lidar system of example 14, wherein: the return signal is a reflected version of the first transmit signal and the respective pixel corresponding to the return signal is the initial pixel; and the second return signal is a reflected version of the second transmit signal and the second respective pixel corresponding to the second return signal is the subsequent pixel.

Example 16: The lidar system of example 13, wherein the at least one processing unit in comparing in the frequency domain of the return signal to the first template signal and the second template signal is configured to: generate the first template signal in a frequency domain and the second template signal in the frequency domain; generate a Fourier transform of the return signal; and compare the Fourier transform of the return signal to the first template signal and to the second template signal.

Example 17: The lidar system of example 16, wherein the at least one processing unit in comparing of the Fourier transform of the return signal to the first template signal and to the second template signal is configured to perform a cross-correlation, a convolution, or a match-filtering method.

Example 18: The lidar system of example 13, wherein the at least one processing unit in determining of the respective pixel of the two consecutive pixels corresponding to the return signal is configured to: determine, among the first comparison result and the second comparison result, a largest peak value and a frequency of the largest peak value, wherein the frequency of the largest peak value is a beat frequency of the return signal; and identify a template signal used to generate a comparison result associated with the largest peak value, the template signal among the first template signal and the second template signal, associated with the largest peak value and the comparison result among the first result and the second comparison result.

Example 19: The lidar system of example 13, wherein the lidar system is a lidar system of an automobile.

Example 20: A computer-readable storage media comprising computer-executable instructions that, when executed, cause a processor of a lidar system to: accept a return signal from a receiver of the lidar system, the return signal received during a detection window in which at least a portion of a first transmit signal and at least a portion of a second transmit signal are transmitted by the lidar system, the first transmit signal having a first amplitude modulation, the second transmit signal having a second amplitude modulation that is different than the first amplitude modulation; generate, by comparing in a frequency domain the return signal to a first template signal and a second template signal, a first comparison result and a second comparison result, respectively, the first template signal having the first amplitude modulation, the second template signal having the second amplitude modulation; determine, based on the first comparison result and the second comparison result, a respective pixel of the two consecutive pixels that corresponds to the return signal; and identify, based on the return signal, a characteristic of an object that reflected the return signal, the object located within an area associated with the respective pixel.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method performed by a lidar system comprising:
transmitting, for an initial pixel of two consecutive pixels, a first transmit signal, the first transmit signal having a first amplitude modulation;
transmitting, for a subsequent pixel of the two consecutive pixels, a second transmit signal, the second transmit signal having a second amplitude modulation, the second amplitude modulation different than the first amplitude modulation;
receiving, during a detection window and in which at least a portion of the first transmit signal and the second transmit signal are transmitted, a return signal;
generating, by comparing in a frequency domain the return signal to a first template signal and a second template signal, a first comparison result and a second comparison result, respectively, the first template signal having the first amplitude modulation, the second template signal having the second amplitude modulation;
determining, based on the first comparison result and the second comparison result, a respective pixel of the two consecutive pixels that corresponds to the return signal; and
identifying, based on the return signal, a characteristic of an object that reflected the return signal, the object located within an area associated with the respective pixel.

2. The method of claim 1 further comprising:
receiving, during the detection window, a second return signal, the return signal and the first return signal forming a composite return signal;
wherein the generating of the first comparison result and the second comparison result comprises generating, by comparing in the frequency domain the composite return signal to the first template signal and the second template signal, a first comparison result and a second comparison result, respectively;
wherein the determining of the respective pixel of the two consecutive pixels that corresponds to the return signal comprises determining, based on the first comparison result and the second comparison result, the respective pixel of the two consecutive pixels that corresponds to the return signal and a second respective pixel of the two consecutive pixels that corresponds to the second return signal; and
identifying, based on the second return signal, a characteristic of a second object that reflected the second return signal, the second object located within an area associated with the second respective pixel.

3. The method of claim 2, wherein:
the return signal is a reflected version of the first transmit signal and the respective pixel corresponding to the return signal is the initial pixel; and
the second return signal is a reflected version of the second transmit signal and the second respective pixel corresponding to the second return signal is the subsequent pixel.

4. The method of claim 2, further comprising:
determining, based on the comparison result corresponding to the respective pixel of the return signal, a beat frequency of the return signal;
determining, based on the comparison result corresponding to the second respective pixel of the second return signal, a beat frequency of the second return signal;
determining that the beat frequency of the return signal and the beat frequency of the second return signal are substantially equal;
generating a filtered return signal, a first filtered template signal, and a second filtered template signal by filtering the beat frequencies of the return signal and the second return signal, a center frequency of the first template signal, and a center frequency of the second template signal, respectively;
generating, by comparing in the frequency domain the filtered return signal with the first filtered template signal and the second filtered template signal, a first filtered comparison result and a second filtered comparison result; and
confirming, based on the first filtered comparison result and the second filtered comparison result, the respective pixel of the two consecutive pixels corresponding to the first filtered return signal and the second respective pixel of the two consecutive pixels corresponding to the second filtered return signal.

5. The method of claim 1, wherein the comparing in the frequency domain of the return signal to the first template signal and the second template signal comprises:
generating the first template signal in a frequency domain and the second template signal in the frequency domain;
generating a Fourier transform of the return signal; and
comparing the Fourier transform of the return signal to the first template signal and to the second template signal.

6. The method of claim 5, wherein the comparing of the Fourier transform of the return signal to the first template signal and to the second template signal comprises performing a cross-correlation, a convolution, or a match-filtering method.

7. The method of claim 1, wherein the determining of the respective pixel of the two consecutive pixels corresponding to the return signal comprises:
determining, among the first comparison result and the second comparison result, a largest peak value and a frequency of the largest peak value, wherein the frequency of the largest peak value is a beat frequency of the return signal; and
identifying a template signal used to generate a comparison result associated with the largest peak value, the template signal among the first template signal and the second template signal and associated with the largest peak value and the comparison result among the first comparison result and the second comparison result.

8. The method of claim 7, wherein:
the first template signal has first side bands corresponding to the first amplitude modulation;
the second template signal has second side bands corresponding to the second amplitude modulation; and
the method further comprising comparing frequency offsets of the side bands of the template signal associated with the largest peak value with the first side bands and the second side bands.

9. The method of claim 1, wherein the characteristic of the object comprises at least one of the following: a distance from the lidar system to the object; or a radial velocity of the object relative to the lidar system.

10. The method of claim 9, further comprising determining an angle between the lidar system and the object based on an angular position of the respective pixel.

11. The method of claim 1, wherein the first transmit signal comprises one or more first chirps and the second transmit signal comprises one or more second chirps.

12. The method of claim 1, further comprising:
transmitting, for another subsequent pixel of three consecutive pixels, a third transmit signal, the third transmit signal having a third amplitude modulation, the third amplitude modulation different than both the first amplitude modulation and the second amplitude modulation, the three consecutive pixels including the two consecutive pixels.

13. A lidar system comprising at least one processing unit configured to:
accept a return signal from a receiver of the lidar system, the return signal received during a detection window in which at least a portion of a first transmit signal and at least a portion of a second transmit signal are transmitted by the lidar system, the first transmit signal having a first amplitude modulation, the second transmit signal having a second amplitude modulation that is different than the first amplitude modulation;
generate, by comparing in a frequency domain the return signal to a first template signal and a second template signal, a first comparison result and a second comparison result, respectively, the first template signal having the first amplitude modulation, the second template signal having the second amplitude modulation;
determine, based on the first comparison result and the second comparison result, a respective pixel of the two consecutive pixels that corresponds to the return signal; and
identify, based on the return signal, a characteristic of an object that reflected the return signal, the object located within an area associated with the respective pixel.

14. The lidar system of claim 13, wherein the at least one processing unit is further configured to:
accept a second return signal from the receiver, the second return signal received during the detection window, the return signal and the first return signal forming a composite return signal;
in generating of the first comparison result and the second comparison result, generate, by comparing in the frequency domain the composite return signal to the first template signal and the second template signal, a first comparison result and a second comparison result, respectively;
in determining of the respective pixel of the two consecutive pixels that corresponds to the return signal, determine, based on the first comparison result and the second comparison result, the respective pixel of the two consecutive pixels that corresponds to the return signal and a second respective pixel of the two consecutive pixels that corresponds to the second return signal; and
identify, based on the second return signal, a characteristic of a second object that reflected the second return signal, the second object located within an area associated with the second respective pixel.

15. The lidar system of claim 14, wherein:
the return signal is a reflected version of the first transmit signal and the respective pixel corresponding to the return signal is the initial pixel; and
the second return signal is a reflected version of the second transmit signal and the second respective pixel corresponding to the second return signal is the subsequent pixel.

16. The lidar system of claim 13, wherein the at least one processing unit in comparing in the frequency domain of the return signal to the first template signal and the second template signal is configured to:
generate the first template signal in a frequency domain and the second template signal in the frequency domain;
generate a Fourier transform of the return signal; and
compare the Fourier transform of the return signal to the first template signal and to the second template signal.

17. The lidar system of claim 16, wherein the at least one processing unit in comparing of the Fourier transform of the return signal to the first template signal and to the second template signal is configured to perform a cross-correlation, a convolution, or a match-filtering method.

18. The lidar system of claim 13, wherein the at least one processing unit in determining of the respective pixel of the two consecutive pixels corresponding to the return signal is configured to:
determine, among the first comparison result and the second comparison result, a largest peak value and a frequency of the largest peak value, wherein the frequency of the largest peak value is a beat frequency of the return signal; and
identify a template signal used to generate a comparison result associated with the largest peak value, the template signal among the first template signal and the second template signal, associated with the largest peak value and the comparison result among the first result and the second comparison result.

19. The lidar system of claim 13, wherein the lidar system is a lidar system of an automobile.

20. A non-transitory computer-readable storage media comprising computer-executable instructions that, when executed, cause a processor of a lidar system to:
accept a return signal from a receiver of the lidar system, the return signal received during a detection window in which at least a portion of a first transmit signal and at least a portion of a second transmit signal are transmitted by the lidar system, the first transmit signal having a first amplitude modulation, the second transmit signal having a second amplitude modulation that is different than the first amplitude modulation;
generate, by comparing in a frequency domain the return signal to a first template signal and a second template signal, a first comparison result and a second comparison result, respectively, the first template signal having the first amplitude modulation, the second template signal having the second amplitude modulation;
determine, based on the first comparison result and the second comparison result, a respective pixel of the two consecutive pixels that corresponds to the return signal; and
identify, based on the return signal, a characteristic of an object that reflected the return signal, the object located within an area associated with the respective pixel.

* * * * *